Patented Apr. 21, 1931

1,801,678

UNITED STATES PATENT OFFICE

WALTER MIEG, OF OPLANDEN, AND ROBERT BERLINER, OF LEVERKUSEN-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE DIANTHRAQUINONYLAMINE-CARBAZOLE SERIES

No Drawing. Application filed December 5, 1929, Serial No. 411,975, and in Germany December 8, 1928.

The present invention relates to new vat dyestuffs of the dianthraquinonylamine-carbazole series, more particularly to vat dyestuffs of the probable general formula

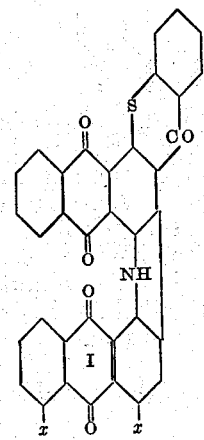

wherein $x$ means hydrogen or a substituted or unsubstituted benzoylamino group, at least one $x$ being a benzoylamino group, and in which the anthraquinone nucleus marked I may be substituted by monovalent substituents.

In accordance with the invention dyestuffs of the above mentioned formula are prepared by reacting upon 4-amino-anthraquinone-1.2-thioxanthone with a 1-halogen-4-or-5-benzoylamino anthraquinone or a substitution product thereof, such as 1-chloro-or-bromo-4-or-5-benzoylamino anthraquinone, 1-benzoylamino-5-chloro-4-methoxy-anthraquinone, 1-meta-methoxy-benzoylamino-4-chloro-anthraquinone or the like in the presence of a suitable high boiling organic solvent, such as naphthalene, nitrobenzene, orthodichlorobenzene or the like, and in the presence of copper or a copper salt and of an acid binding medium. The reaction is performed at elevated temperature, preferably while boiling under reflux. After working up in the usual manner the dianthraquinonylamine compounds of the probable general formula

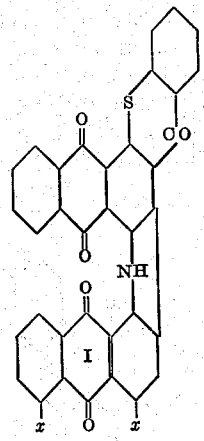

(wherein the littera are to be declared as mentioned above) are obtained, which are treated with a suitable acid ring closing agent, for example with conc. sulfuric acid at room temperature.

There result intermediate products, yielding when treated with an oxidizing agent the dianthraquinonylamine-carbazole compounds mentioned in the first general formula.

As oxidizing agents may be used, e. g. sodium nitrite, chromic acid or the like. The oxidation is advantageously performed by dissolving the oxidizing agent in water and causing the sulfuric acid solutions containing the intermediate products above mentioned to run in whilst stirring. After sucking off, washing and drying, the new vat dyestuffs are obtained in form of brown to grey powders soluble in conc. sulfuric acid with blue to greenish blue colorations, dyeing cotton from an alkaline hydrosulfite vat strong brown to grey shades of good fastness properties.

The following examples illustrate our invention without restricting it thereto:

Example 1

5 parts by weight of the dianthraquinonyl-amine from 4-amino-anthraquinone-1.2-thioxanthone (produced in accordance with British Patent No. 4065/1911) and 1-benzoyl-amino-5-chloranthraquinone, obtainable by the condensation of both components in a high boiling solvent with the addition of an acid binding agent and a copper catalyst, are introduced at about 20° C. into 50 parts by weight of 96% sulfuric acid. The solution which is at first red soon changes to olive. When the change of color is complete the solution is poured into 500–1000 parts of water, to which 3 parts by weight of sodium nitrite have been added. The dark flakes of the carbazole intermediate product are oxidized almost instantaneously and become brown colored. After heating for about one hour at 70–80° C. the product is filtered off and washed. The dyestuff thus obtained forms a brown powder, dissolving in strong sulfuric acid with a blue coloration. It dyes cotton from a yellowish brown hydrosulfite vat blackish brown shades of very satisfactory fastness properties. The product probably corresponds to the formula

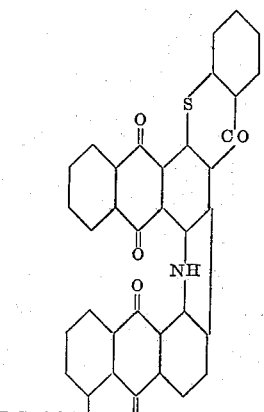

Example 2

5 parts by weight of the condensation product from 4-amino-anthraquinone-1.2-thioxanthone and 1-benzoylamino-5-chloro-4-methoxy anthraquinone are treated in sulfuric acid as described in Example 1. The at first green coloration of the solution changes to a dirty brown, which on the addition of nitrite becomes blue. On pouring into water containing sodium nitrite, reddish brown flakes are obtained, which dye cotton violet brown shades from a yellowish brown vat. The fastness properties of the dyestuff thus produced are similar to those of the dyestuff described in Example 1.

The 1-benzoylamino-5-chloro-4-methoxy anthraquinone referred to in this example can be prepared by nitrating 1-hydroxy-8-chloro-anthraquinone (obtainable by heating anthraquinone-1.8-disulfonic acid with an aqueous lime suspension under super-atmospheric pressure and reacting upon the hydroxyanthraquinone sulfonic acid produced with sodium chlorate and dilute hydrochloric acid), reducing the nitro compound, treating the reduction product with benzoyl-chloride and finally methylating the hydroxy group according to the usual methods.

We claim:—

1. The products of the probable general formula

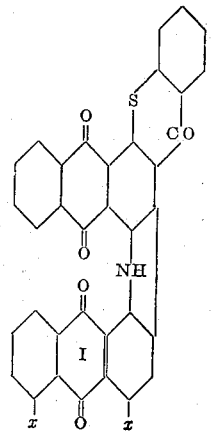

wherein $x$ means hydrogen or a benzoylamino group, at least one $x$ being a benzoylamino group, and in which the anthraquinone nucleus marked I may be substituted by monovalent substituents, said products being brown to grey powders soluble in conc. sulfuric acid with blue to greenish blue colorations, dyeing cotton from an alkaline hydrosulfite vat strong brown to grey shades of good fastness properties.

2. The product of the probable formula

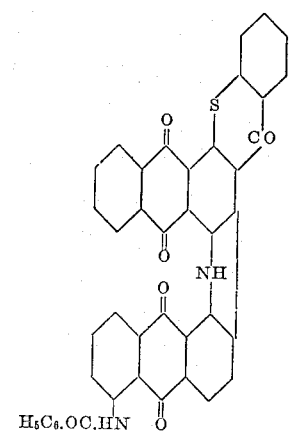

said product being a brown powder dissolving in strong sulfuric acid with a blue coloration dyeing cotton from a yellowish brown hydrosulfite vat blackish brown shades of very satisfactory fastness properties.

In testimony whereof, we affix our signatures.

WALTER MIEG.
ROBERT BERLINER.